(12) United States Patent
Tseng et al.

(10) Patent No.: US 10,338,649 B2
(45) Date of Patent: Jul. 2, 2019

(54) FAN CONTROL APPARATUS AND METHOD OF OPERATING THE SAME

(71) Applicant: ENERMAX TECHNOLOGY CORPORATION, Taoyuan (TW)

(72) Inventors: Chih-Chun Tseng, Taoyuan (TW); Chin-Chen Chu, Taoyuan (TW)

(73) Assignee: ENERMAX TECHNOLOGY CORPORATION, Taoyuan (TW)

( * ) Notice: Subject to any disclaimer, the term of this patent is extended or adjusted under 35 U.S.C. 154(b) by 65 days.

(21) Appl. No.: 15/660,969

(22) Filed: Jul. 27, 2017

(65) Prior Publication Data

US 2018/0307281 A1 Oct. 25, 2018

(30) Foreign Application Priority Data

Apr. 20, 2017 (TW) ............................... 106113242 A

(51) Int. Cl.
*G06F 1/20* (2006.01)
*G05B 15/02* (2006.01)

(52) U.S. Cl.
CPC ............... *G06F 1/20* (2013.01); *G05B 15/02* (2013.01); *G06F 1/206* (2013.01)

(58) Field of Classification Search
None
See application file for complete search history.

(56) References Cited

U.S. PATENT DOCUMENTS

2017/0067664 A1* 3/2017 Hu ........................ G05B 15/02

* cited by examiner

*Primary Examiner* — Carlos R Ortiz Rodriguez
(74) *Attorney, Agent, or Firm* — Chun-Ming Shih; HDLS IPR Services

(57) ABSTRACT

A fan control apparatus used to control a plurality of fans, and the fan control apparatus includes a power port, a control unit, a drive unit, and a trigger switch. The control unit receives a PWM signal with a duty cycle outputted from a processor and the control unit determines whether the duty cycle is greater than at least one threshold value set by the control unit. When the duty cycle is greater than at least one threshold value, the control unit controls the fans through the drive unit.

12 Claims, 7 Drawing Sheets

FAN CONTROL APPARATUS AND METHOD OF OPERATING THE SAME

BACKGROUND

Technical Field

The present invention relates to a fan control apparatus and a method of operating the same, and more particularly to a fan control apparatus and a method of operating the same by using a pulse-width modulation signal outputted from a processor mounted on a main board to drive fans to rotate.

Description of Related Art

With the technological advancements, an integrated circuit (IC) becomes smaller and its computing speed is faster. Therefore, an overheating issue is more serious due to the increased computing speed of the ICs.

Since a heat source is mainly generated from a central processing unit (CPU) in a computer chassis, cooling fans are usually installed in most of the computer chassis to reduce the temperature inside the computer chassis. In general, the cooling fans rotate at the maximum speed as long as the computer is powered on and regardless of whether the computer is in a working state or a standby state; until the computer is powered off, the cooling fans stop rotating. Since the heat generated from the CPU is not too much when the computer is operated in a light-load condition or a standby condition, the cooling fans rotated at the maximum speed would cause power waste. In addition, unnecessary noises are produced from the cooling fans while the cooling fans are continuously rotating.

SUMMARY

In order to solve the above-mentioned problem, the present invention provides a fan control apparatus. The fan control apparatus includes a power port, a control unit, a drive unit, and a trigger switch. The control unit is connected between the power port and a processor mounted on a main board. The drive unit is connected to the control unit. The trigger switch is connected to the control unit. The control unit receives a pulse-width modulation signal with a duty cycle outputted from the processor, and the control unit determines whether the duty cycle is greater than at least one threshold value set by the control unit, wherein the duty cycle is varied according to the number of triggering of the trigger switch; when the duty cycle is greater than the at least one threshold value, the control unit controls a plurality of fans through the drive unit.

In order to solve the above-mentioned problem, the present invention provides a method of operating a fan control apparatus. The fan control apparatus is connected between a processor mounted on a main board and a plurality of fans, and the method includes steps of: (a) receiving a pulse-width modulation signal outputted from the processor by the fan control apparatus; (b) triggering a trigger switch of the fan control apparatus; (c) setting at least one threshold value and determining whether the duty cycle of the pulse-width modulation signal is greater than the at least one threshold value, wherein the at least one threshold value is varied according to the number of triggering of the trigger switch; and (d) driving the fans to rotate when the duty cycle is greater than that at least one threshold value.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed description of the embodiment, with reference made to the accompanying drawings as follows.

DETAILED DESCRIPTION

Figure 1:
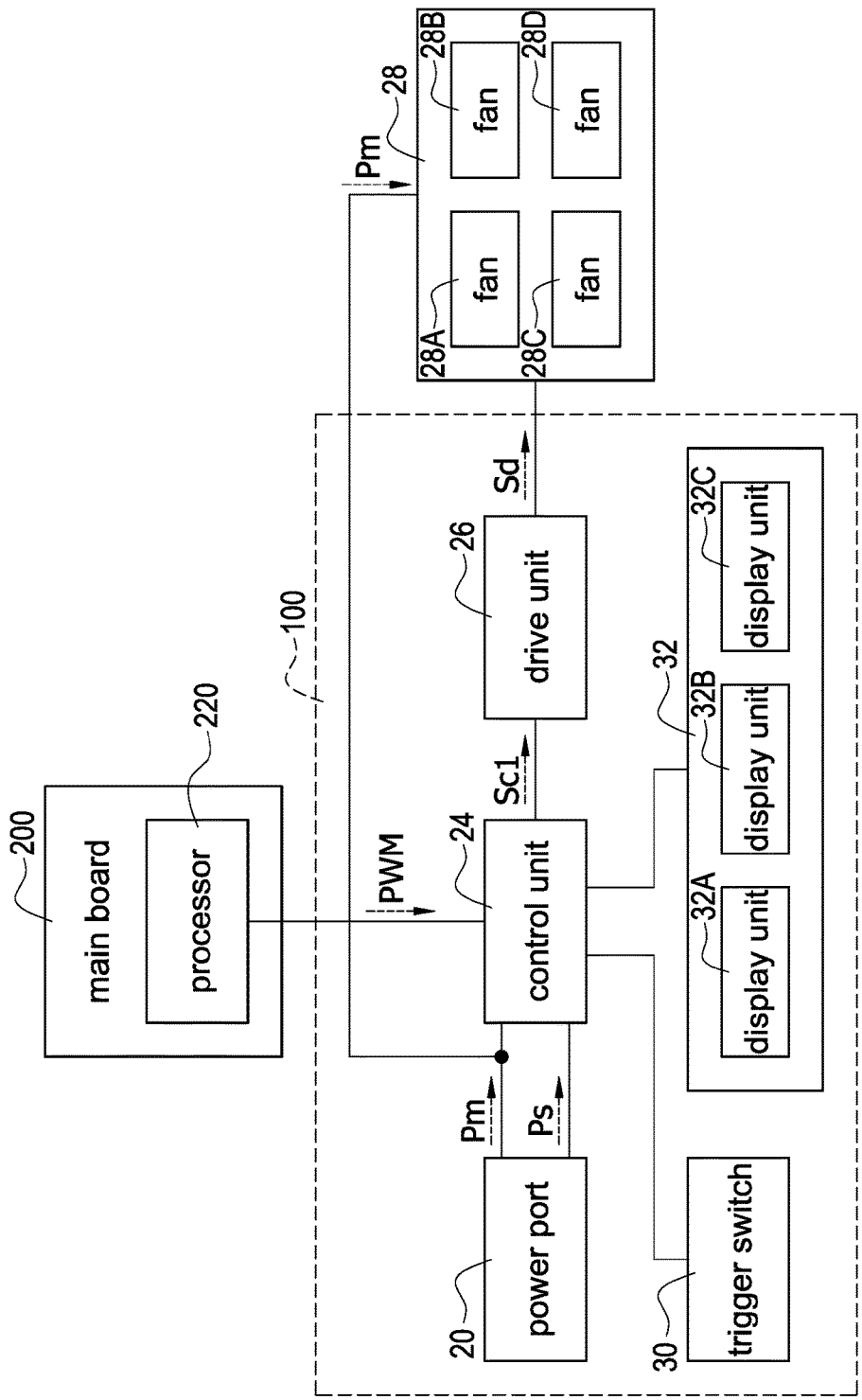
FIG. 1 shows a schematic circuit block diagram of a fan control apparatus according to the present invention.

Reference will now be made to the drawing figures to describe the present invention in detail. It will be understood that the drawing figures and exemplified embodiments of present invention are not limited to the details thereof.

Refer to FIG. 1, which shows a schematic circuit block diagram of a fan control apparatus according to the present invention. The fan control apparatus 100 includes a power port 20, a control unit 24, and a drive unit 26, and the fan control apparatus 100 is used to control a fan assembly 28. The power port 20 is connected to an external power source (not shown) to receive a main power source Pm and an auxiliary power source Ps. The main power source Pm and the auxiliary power source Ps are used to provide the required power to the fan control apparatus 100. The control unit 24 is connected between the power port 20 and a processor 220 mounted on the main board 200. The power port 20 is used to receive the main power source Pm and the auxiliary power source Ps, and further receive a pulse-width modulation signal PWM outputted from the processor 220. The fan assembly 28 includes a plurality of fans 28A-28D connected to the power port 20 and the fans 28A-28D are supplied by the main power source Pm or the auxiliary power source Ps through the power port 20. In this embodiment, the main power source Pm is used to provide the required power to the fans 28A-28D. When the control unit 24 receives the pulse-width modulation signal PWM outputted from the processor 220, the control unit 24 calculates a duty cycle D of the pulse-width modulation signal PWM, produces a first control signal Sc1 according to the duty cycle D of the pulse-width modulation signal PWM, and outputs the first control signal Sc1 to the drive unit 26. The drive unit 26 is connected between the control unit 24 and the fans 28A-28D. The drive unit 26 receives the first control signal Sc1 outputted from the control unit 24, produces a drive signal Sd according to the first control signal Sc1, and outputs the drive signal Sd to the fans 28A-28D to drive the fans 28A-28D to rotate.

In this embodiment, the main power source Pm is, for example but not limited to, 12 volts and the auxiliary power source Ps is, for example but not limited to, 5 volts. In other words, only if a voltage level of the main power source Pm or that of the auxiliary power source Ps can be supplied to make the fan control apparatus 100 normally operate, the main power source Pm and the auxiliary power source Ps are intended to be embraced within the scope of the present invention. In this embodiment, the fan control apparatus 100 is mainly applied to be, for example but not limited to, used as a fan control apparatus in computer equipment. In other words, a processor which adjusts the duty cycle D of the pulse-width modulation signal PWM according to variations of ambient temperature can be used as the processor 220 of the fan control apparatus 100. In this embodiment, the drive unit is, for example but not limited to, a non-inverting amplifier with a signal delay function and a signal amplification function. In other words, a drive unit which can output the drive signal Sd to drive the fans 28A-28D can be used as the drive unit 26, such as an inverting amplifier IC or an amplifier unit implemented by physical circuits.

With reference to FIG. 1 again, the fan control apparatus 100 further includes a trigger switch 30 and a display unit assembly 32. The trigger switch 30 is connected to the control unit 24. The control unit 24 adjusts the duty cycle D of the pulse-width modulation signal PWM to make the fans 28A-28D rotate. The display unit assembly 32 is connected to the control unit 24. The display unit assembly 32 includes a plurality of display units 32A-32C for rendering the number of triggering of the trigger switch 30. Since the control unit 24 adjusts the duty cycle D of the pulse-width modulation signal PWM to make the fans 28A-28D rotate, the displayed number of triggering of the trigger switch 30 facilitates the user to identify and realize the number of triggering of the trigger switch 30. In this embodiment, the trigger switch 30 may be operated in a cycle trigger mode. Once the number of triggering of the trigger switch 30 operated by the user is greater than a maximum number of triggering set by the control unit 24, the number of triggering of the trigger switch 30 is rendered as a non-trigger state or the an one-trigger state. For example, it is assumed that a number of the display units 32A-32C is three. If the trigger switch 30 is triggered two times by the user, the first two display units 32A, 32B are illuminated and the last one display unit 32C is not illuminated. If the trigger switch 30 is triggered five times by the user, the three display units 32A-32C are illuminated after the trigger switch 30 is triggered three times, the three display units 32A-32C are not illuminated after the trigger switch 30 is triggered four times, and the first one display unit 32A is illuminated and the last two display units 32B, 32C are not illuminated after the trigger switch 30 is triggered five times. In another embodiment, if the trigger switch 30 is triggered five times by the user, the three display units 32A-32C are illuminated after the trigger switch 30 is triggered three times, the first one display unit 32A is illuminated and the last two display units 32B, 32C are not illuminated after the trigger switch 30 is triggered four times, and the first two display units 32A, 32B are illuminated and the last one display unit 32C is not illuminated after the trigger switch 30 is triggered five times.

In this embodiment, the number of the display units 32A-32C is not limited as long as it can be larger than the maximum number of triggering set by the control unit 24. In addition, in this embodiment, the display units 32A-32C can be, for example but not limited to, light-emitting diodes (LEDs). In other words, display units which visually show the number of triggering of the trigger switch 30 can be used as the display units 32A-32C. Further, in this embodiment, the trigger switch 30 can be, for example but not limited to, pressed by the user. In other words, a dip switch or an inductive switch may be used as the trigger switch 30. In addition, the number of the trigger switch 30 can be one for the user to sequentially operate different trigger switches 30. For example, it is assumed that the number of the trigger switch 30 is four and the four trigger switches 30 are sequentially operated by the user to correspondingly trigger the fan control apparatus 100.

With reference also to FIG. 1. There are two manners of controlling the fans 28A-28D to rotate. The first one is: all fans 28A-28D are controlled to rotate when the control unit 24 detects that the duty cycle D of the pulse-width modulation signal PWM is greater than a threshold value Vt set by the control unit 24. The second one is: the fans 28A-28D are controlled to successively rotate when the control unit 24 detects that the duty cycle D of the pulse-width modulation signal PWM is successively greater than a plurality of threshold values Vt1-Vtn. The operations of the two manners of controlling the fans 28A-28D to rotate will be described below in FIG. 2A and FIG. 2B. In this embodiment, the number of the fans 28A-28D is, for example but not limited to, four, and the four fans 28A-28D are connected to the drive unit 26 as well as types of the fans 28A-28D.

Figure 2A:
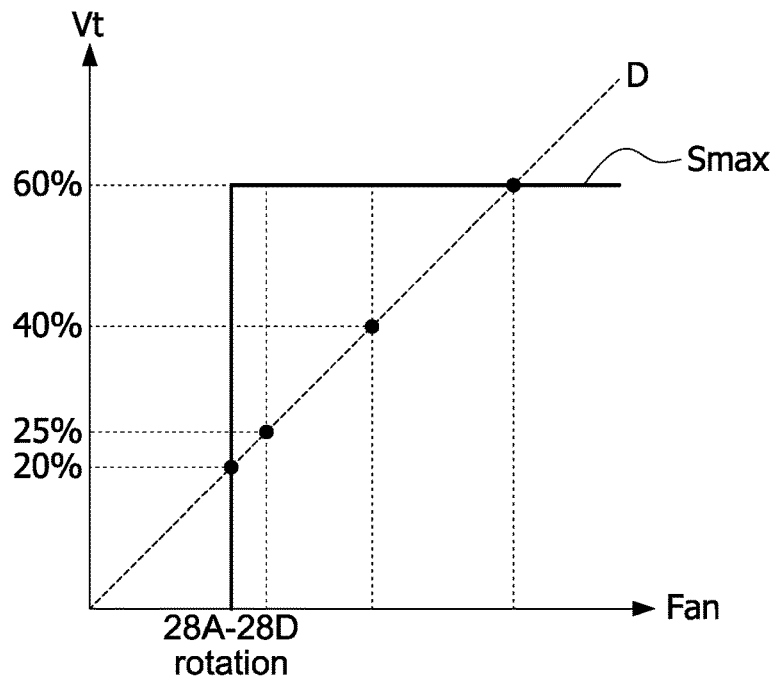
FIG. 2A shows a waveform graph of the fan control apparatus according to a first embodiment of the present invention.

Refer to FIG. 2A, which shows a waveform graph of the fan control apparatus according to a first embodiment of the present invention. With reference also to FIG. 1. In this embodiment, when the control unit 24 detects that the duty cycle D of the pulse-width modulation signal PWM is greater than the threshold value Vt, the control unit 24 controls all fans 28A-28D to rotate. Also, the threshold value Vt is initially set to 20%. When detecting the pulse-width modulation signal PWM, the control unit 24 calculates the duty cycle D of the pulse-width modulation signal PWM. If the duty cycle D of the pulse-width modulation signal PWM is less than or equal to 20%, the first control signal Sc1 is not outputted from the control unit 24, thereby controlling the fans 28A-28D to stop rotating to reduce power consumption and noise while the processor 220 is operating at a light-load condition. When the duty cycle D of the pulse-width modulation signal PWM is increased to be greater than 20% due to increased temperature of the processor 220, the control unit 24 controls all fans 28A-28D to rotate, thereby increasing cooling efficiency of the fans 28A-28D while the processor 220 is operating over a middle-load condition.

As shown by thick solid lines in FIG. 2A, the threshold value Vt is initially set to 20% and the trigger switch 30 is not triggered, that is all display units 32A-32C are not illuminated. When the duty cycle D of the pulse-width modulation signal PWM is greater than 20%, all fans 28A-28D rotate. Similarly, when the trigger switch 30 is triggered once, the first display unit 32A is illuminated and the threshold value Vt is changed/adjusted (from 20%) to 25%. In this condition, when the duty cycle D of the pulse-width modulation signal PWM is greater than 25%, all fans 28A-28D rotate. The rest may be deduced by analogy.

When the trigger switch 30 is triggered three times, the three display units 32A-32C are illuminated and the threshold value Vt is changed (from 20%) to 60%. In this condition, when the duty cycle D of the pulse-width modulation signal PWM is greater than 60%, all fans 28A-28D rotate. Moreover, when the trigger switch 30 is triggered four times, the three display units 32A-32C are not illuminated and the threshold value Vt is changed (from 60%) to 20%. In this condition, when the duty cycle D of the pulse-width modulation signal PWM is greater than 20%, all fans 28A-28D rotate, that is it likes to the condition that the trigger switch 30 is not triggered. Similarly, when the trigger switch 30 is triggered five times, the condition likes to the condition that the trigger switch 30 is triggered once. The rest may be deduced by analogy. In another embodiment, when the trigger switch 30 is triggered four times, the condition likes to the condition that the trigger switch 30 is triggered once, that is the condition that the trigger switch 30 is omitted as mentioned above.

Refer to FIG. 2A again and with reference also to FIG. 1. When the user presses the trigger switch 30, the threshold value Vt is changed by the control unit 24. For example, in this embodiment, there are three threshold values Vt can be changed/adjusted, such as 25%, 40%, and 60% by triggering the trigger switch 30. When the trigger switch 30 is triggered twice and the duty cycle D of the pulse-width modulation signal PWM calculated by the control unit 24 is less than or equal to 40%, the control unit 24 controls all fans 28A-28D to stop rotating. On the contrary, when the duty cycle D of the pulse-width modulation signal PWM calculated by the control unit 24 is greater than 40%, the control unit 24 controls all fans 28A-28D to rotate. At this time, the first two display units 32A, 32B of the display unit assembly 32 are illuminated for facilitating the user to identify and realize that the number of triggering of the trigger switch 30 is two. In addition, the detail descriptions of the 25%-threshold value (corresponding to the trigger switch 30 is equivalently triggered once) and the 60%-threshold value (corresponding to the trigger switch 30 is equivalently triggered three times) are omitted here for conciseness. In this embodiment, the number of the threshold value Vt is not limited to be triggered three times, that is, at least one threshold value Vt can be set by the control unit 24 according to actual requirements of the fan control apparatus 100.

Figure 2B:
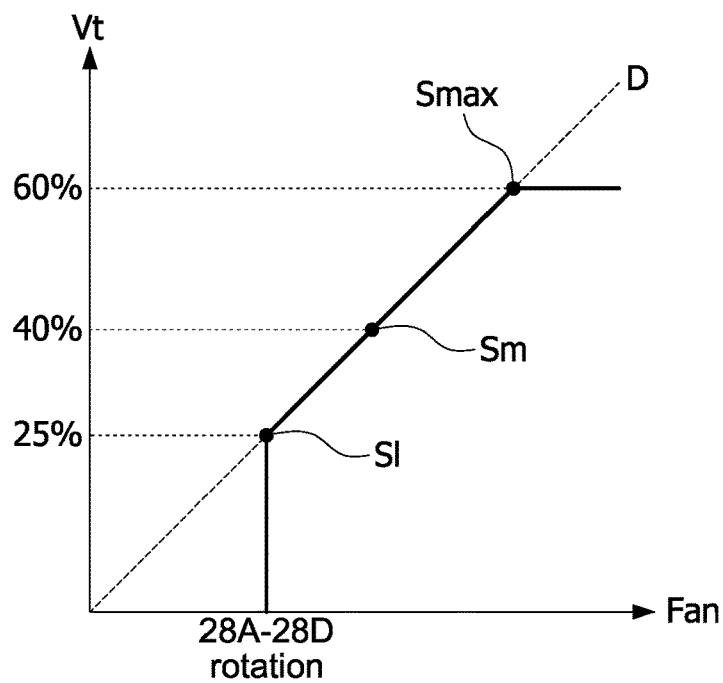
FIG. 2B shows a waveform graph of the fan control apparatus according to a second embodiment of the present invention.

Refer to FIG. 2B, which shows a waveform graph of the fan control apparatus according to a second embodiment of the present invention. With reference also to FIG. 1 and FIG. 2A. The difference between the first embodiment shown in FIG. 2A and the second embodiment shown in FIG. 2B is that speed of the fans 28A-28D is gradually increased according to the gradually increased duty cycle D. In this embodiment, the control unit 24 may control all fans 28A-28D to rotate at a maximum speed Smax when the duty cycle D of the pulse-width modulation signal PWM is greater than a threshold value Vt, such as 60% shown in FIG. 2B. In addition, the control unit 24 may control to gradually increase speed of all fans 28A-28D according to the gradually increased duty cycle D so as to reduce power consumption of the fans 28A-28D. For example, as shown by thick solid lines in FIG. 2B, when the duty cycle D is less than or equal to 25%, the control unit 24 controls all fans 28A-28D to stop rotating since the trigger switch 30 is pressed once by the user. When the duty cycle D is greater than 25%, the control unit 24 controls the fans 28A-28D to rotate at a low speed Sl. Also, the control unit 24 controls to gradually increase speed of the fans 28A-28D from the low speed Sl to a middle speed Sm by gradually increasing the duty cycle D from 25% to 40%. Similarly, when the duty cycle D is greater than 40%, the control unit 24 controls the fans 28A-28D to rotate at the middle speed Sm. Also, the control unit 24 controls to gradually increase speed of the fans 28A-28D from the middle speed Sm to the maximum speed Smax by gradually increasing the duty cycle D from 40% to 60%. When the duty cycle D is greater than 60%, the control unit 24 controls the fans 28A-28D to rotate at the maximum speed Smax.

Similarly, when the duty cycle D is less than or equal to 40%, the control unit 24 controls all fans 28A-28D to stop rotating since the trigger switch 30 is pressed twice by the user. When the duty cycle D is greater than 40%, the control unit 24 controls the fans 28A-28D to rotate at the middle speed Sm. Also, the control unit 24 controls to gradually increase speed of the fans 28A-28D from the middle speed Sm to the maximum speed Smax by gradually increasing the duty cycle D from 40% to 60%. When the duty cycle D is greater than 60%, the control unit 24 controls the fans 28A-28D to rotate at the maximum speed Smax. Similarly, when the duty cycle D is less than or equal to 60%, the control unit 24 controls all fans 28A-28D to stop rotating since the trigger switch 30 is pressed three times by the user. When the duty cycle D is greater than 60%, the control unit 24 controls the fans 28A-28D to rotate at the maximum speed Smax.

Figure 2C:
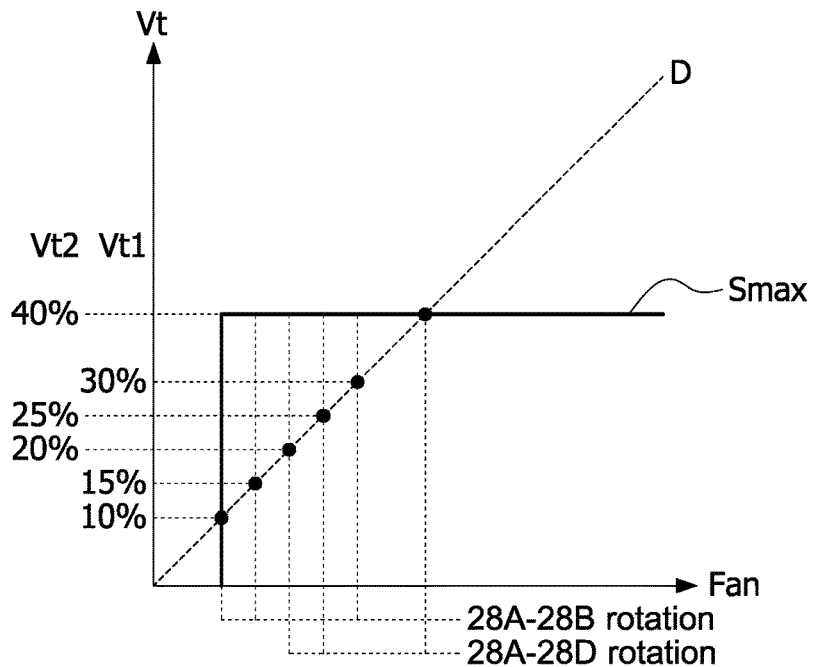
FIG. 2C shows a waveform graph of the fan control apparatus according to a third embodiment of the present invention.

Refer to FIG. 2C, which shows a waveform graph of the fan control apparatus according to a third embodiment of the present invention. With reference also to FIG. 1 and FIG. 2A-FIG. 2B. In this embodiment, the control unit 24 controls to gradually increase the number of the fans 28A-28D which rotate according to the gradually increased duty cycle D by adjusting the threshold values Vt1-Vtn. For example, two threshold values, namely a first threshold value Vt1 and a second threshold value Vt2 can be simultaneously set. In particular, a reference threshold value of the first threshold value Vt1 is 10% and a reference threshold value of the second threshold value Vt2 is 20%. As shown in FIG. 2C, the first threshold value Vt1 which can be adjusted to 10%, 15%, and 30% is provided to control the fans 28A, 28B; the second threshold value Vt2 which can be adjusted to 20%, 25%, and 40% is provided to control the fans 28A-28D. In other words, when the trigger switch 30 is not pressed by the user in the initial state, the first threshold value Vt1 is equal to the reference threshold value thereof (10%) and the second threshold value Vt2 is equal to the reference threshold value thereof (20%). When the trigger switch 30 is pressed once, the first threshold value Vt1 is adjusted from 10% to 15% by the control unit 24 and the second threshold value Vt2 is adjusted from 20% to 25% by the control unit 24. Similarly, when the trigger switch 30 is pressed twice, the first threshold value Vt1 is adjusted from 10% to 30% by the control unit 24 and the second threshold value Vt2 is adjusted from 20% to 40% by the control unit 24.

As shown by thick solid lines in FIG. 2C, a non-trigger state of the trigger switch 30 is used as an example to illustrate. When the control unit 24 detects the pulse-width modulation signal PWM, the control unit 24 calculates the duty cycle D of the pulse-width modulation signal PWM. When the duty cycle D is less than or equal to 10% (namely the reference threshold value of the first threshold value Vt1), the first control signal Sc1 is not outputted from the control unit 24, thereby controlling the fans 28A-28D to stop rotating. When the duty cycle D is greater than 10% and less than or equal to 20% (namely the reference threshold value of the second threshold value Vt2), the control unit 24 controls the fans 28A, 28B to rotate and controls the fans 28C, 28D to stop rotating. When the duty cycle D is greater than 20%, the control unit 24 controls all fans 28A-28D to rotate. Accordingly, the control unit 24 controls to gradually increase the number of the fans 28A-28D which rotate according to the gradually increased duty cycle D to reduce power consumption and noise while the fans 28A-28D are rotating.

Refer to FIG. 2C again and with reference also to FIG. 1-FIG. 2B. When the user triggers the trigger switch 30, the control unit 24 adjusts the threshold values Vt1, Vt2 or increases the number of the threshold values Vt1, Vt2 according to the number of triggering of the trigger switch 30. For example, the trigger switch 30 is pressed to adjust the threshold values Vt1, Vt2. For example, when the trigger switch 30 is pressed once, the first threshold value Vt1 is adjusted from 10% to 15% and the second threshold value Vt2 is adjusted from 20% to 25%. Similarly, when the trigger switch 30 is pressed twice, the first threshold value Vt1 is adjusted from 10% to 30% and the second threshold value Vt2 is adjusted from 20% to 40%. Also, when the user presses the trigger switch 30 twice, the display units 32A, 32B of the display unit assembly 32 are illuminated for facilitating the user to identify and realize that the number of triggering of the trigger switch 30 is two. Also, when the duty cycle D of the pulse-width modulation signal PWM calculated by the control unit 24 is less than or equal to 30% (namely an adjusted reference threshold value of the first threshold value Vt1 since the trigger switch 30 is pressed twice), the first control signal Sc1 is not outputted from the control unit 24, thereby controlling the fans 28A-28D to stop rotating. When the duty cycle D is greater than 30% and less than or equal to 40% (namely an adjusted reference threshold value of the second threshold value Vt2 since the trigger switch 30 is pressed twice), the control unit 24 controls the fans 28A, 28B to rotate and controls the fans 28C, 28D to stop rotating. When the duty cycle D is greater than 40%, the control unit 24 controls all fans 28A-28D to rotate. In this embodiment, the number of the threshold values Vt1-Vtn is not limited to be triggered twice, that is, at least one threshold value Vt1-Vtn can be set by the control unit 24 according to actual requirements of the fan control apparatus 100.

Figure 2D:
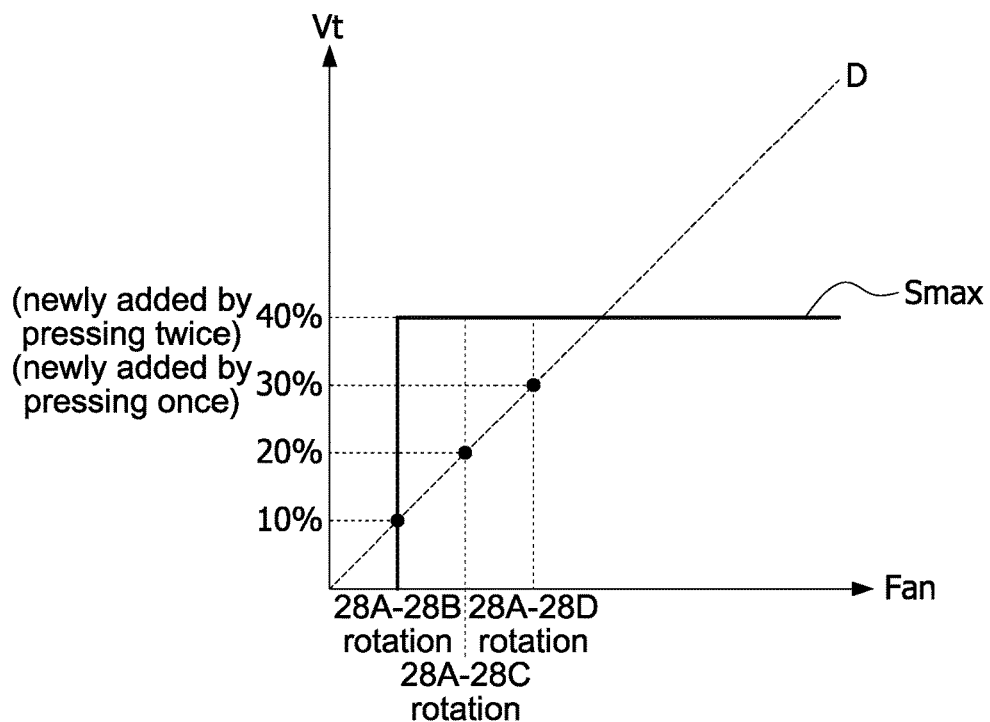
FIG. 2D shows a waveform graph of the fan control apparatus according to a fourth embodiment of the present invention.

Refer to FIG. 2D, which shows a waveform graph of the fan control apparatus according to a third embodiment of the present invention. With reference also to FIG. 1 and FIG. 2A-FIG. 2C. The difference between the third embodiment shown in FIG. 2C and the fourth embodiment shown in FIG. 2D is that the control unit 24 adjusts the number of the threshold values Vt1, Vt2 according to the number of triggering of the trigger switch 30. In this embodiment, the number of the threshold values Vt1, Vt2 is adjusted by triggering the trigger switch 30. When the trigger switch 30 is not pressed by the user in the initial state, the threshold values Vt1, Vt2 are 10% and 20%, respectively. When the trigger switch 30 is pressed once, a threshold value Vt3 is newly added. Also, when the trigger switch 30 is pressed twice, a threshold value Vt4 is further newly added, that is the all threshold values Vt1-Vt4 are 10%, 20%, 30%, and 40%, respectively.

As shown by thick solid lines in FIG. 2D, an one-trigger state of the trigger switch 30 is used as an example to illustrate. When the trigger switch 30 is pressed once, three threshold values Vt1-Vt3 (namely 10%, 20%, and 30%) are provided. At this time, the display unit 32A of the display unit assembly 32 is illuminated for facilitating the user to identify and realize that the number of triggering of the trigger switch 30 is one. When the duty cycle D is less than or equal to 10%, the first control signal Sc1 is not outputted from the control unit 24, thereby controlling the fans 28A-28D to stop rotating. When the duty cycle D is greater than 10% and less than or equal to 20%, the control unit 24 controls the fans 28A, 28B to rotate and controls the fans 28C, 28D to stop rotating. When the duty cycle D is greater than 20% and less than or equal to 30%, the control unit 24 controls the fans 28A-28C to rotate and controls the fan 28D to stop rotating. When the duty cycle D is greater than 30%, the control unit 24 controls all fans 28A-28D to rotate.

In addition, a non-trigger state of the trigger switch 30 is used as an example to illustrate. When the trigger switch 30 is not triggered, two threshold values Vt1 (10%), Vt2 (20%) are provided. When the duty cycle D is less than or equal to 10%, the first control signal Sc1 is not outputted from the control unit 24, the control unit 24 controls all fans 28A-28D to stop rotating. When the duty cycle D is greater than 10% and less than or equal to 20%, the control unit 24 controls the fans 28A, 28B to rotate and controls the fans 28C, 28D to stop rotating. When the duty cycle D is greater than 20%, the control unit 24 controls all fans 28A-28D to rotate.

Similarly, a two-trigger state of the trigger switch 30 is used as an example to illustrate. When the trigger switch 30 is pressed twice, four threshold values Vt1 (10%), Vt2 (20%), Vt3 (30%), and Vt4 (40%) are provided. Also, the display units 32A, 32B of the display unit assembly 32 are illuminated for facilitating the user to identify and realize that the number of triggering of the trigger switch 30 is two. When the duty cycle D is less than or equal to 10%, the control unit 24 controls all fans 28A-28D to stop rotating. When the duty cycle D is greater than 10% and less than or equal to 30%, the control unit 24 controls the fans 28A, 28B to rotate and controls the fans 28C, 28D to stop rotating. When the duty cycle D is greater than 30% and less than or equal to 40%, the control unit 24 controls the fans 28A-28C to rotate and controls the fan 28D to stop rotating. When the duty cycle D is greater than 40%, the control unit 24 controls all fans 28A-28D to rotate. In particular, the embodiments of the threshold values Vt1-Vtn in FIG. 2C and FIG. 2D and the embodiments of the threshold value Vt in FIG. 2A and FIG. 2B may be mutually applied so as to flexibly configure the fans 28A-28D by the fan control apparatus 100.

Furthermore, the second embodiment of FIG. 2B can be applied to embodiments of FIG. 2C and FIG. 2D. The control unit 24 may control to gradually increase speed of the fans 28A-28D according to the gradually increased duty cycle D so as to reduce power consumption of the fans 28A-28D. For example, the first threshold value Vt1 is equal to 10% and the second threshold value Vt2 is equal to 20%. When the duty cycle D is greater than 10% and less than or equal to 20%, the control unit 24 controls the fans 28A, 28B to rotate at the low speed Sl. Also, the control unit 24 controls to gradually increase speed of the fans 28A, 28B from the low speed Sl to the middle speed Sm by gradually increasing the duty cycle D. When the duty cycle D is greater than 20%, the control unit 24 controls the fans 28A, 28B to rotate at the middle speed Sm. In addition, a group of fans 28A-28D can be newly added in the embodiments of FIG. 2A-FIG. 2D, and the added fans 28A-28D can be driven by the pulse-width modulation signal PWM. When the fans 28A-28D are driven by the pulse-width modulation signal PWM, any one of the threshold values Vt1-Vtn is not set by the control unit 24 so that speed of the fans 28A-28D is directly varied by the pulse-width modulation signal PWM.

Figure 3:
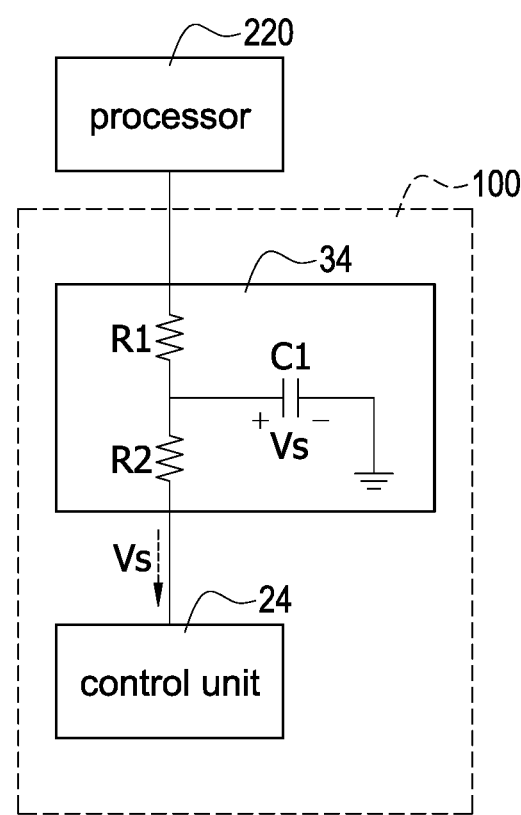
FIG. 3 shows a circuit diagram of an integral unit of the fan control apparatus according to the present invention.

Refer to FIG. 3, which a circuit diagram of an integral unit of the fan control apparatus according to the present invention. The fan control apparatus 100 further includes an integral unit 34. The integral unit 34 is connected between the processor 220 and the control unit 24. The integral unit 34 integrates the pulse-width modulation signal PWM into a voltage signal Vs, and the voltage signal Vs is transmitted to the control unit 24. The control unit 24 determines the duty cycle D of the pulse-width modulation signal PWM according to the voltage signal Vs. In general, the duty cycle D is typically between zero and one. In particular, since different types of control ICs can be used as the control unit 24 and each manner of controlling the duty cycle D therefore may be different to each other, the fan control apparatus 100 does not need to provide the integral unit 34 when a duty cycle calculation unit (not shown) is built in the control IC. On the contrary, if no duty cycle calculation unit is built in the control IC, the integral unit 34 has to be added between the processor 220 and the control unit 24 of the fan control apparatus 100 so that the control unit 24 determines the duty cycle D of the pulse-width modulation signal PWM according to the voltage signal Vs. After determining the duty cycle D according to the voltage signal Vs, the control unit 24 determines whether the duty cycle D is greater than the threshold value Vt1-Vtn corresponding to the number of triggering of the trigger switch 30 according to the number of triggering of the trigger switch 30 and determines whether the fans 28A-28D rotate and rotating type or quantity of the fans 28A-28D. In this embodiment, the integral unit 34 added between the processor 220 and the control unit 24 is, for example but not limited to, used to obtain the voltage signal Vs of the pulse-width modulation signal PWM so that the control unit 24 acquires the duty cycle D of the pulse-width modulation signal PWM according to the voltage signal Vs.

The integral unit 34 includes a first resistor R1, a second resistor R2, and a first capacitor C1. One end of the first resistor R1 is connected to the processor 220, the other end of the first resistor R1 is connected to one end of the second resistor R2, and the other end of the second resistor R2 is connected to the control unit 24. One end of the first capacitor C1 is connected to an intersection node of the first resistor R1 and the second resistor R2, and the other end of the first capacitor C1 is grounded. When the integral unit 43 receives the pulse-width modulation signal PWM outputted from the processor 220, the pulse-width modulation signal PWM is provided to charge the first capacitor C1 so that the voltage signal Vs is formed across two ends of the first capacitor C1. The control unit 24 receives the voltage signal Vs, calculates the duty cycle D of the pulse-width modulation signal PWM according to the voltage signal Vs, and determines whether the fans 28A-28D rotate or not. In this embodiment, the integral unit 34 can be implemented, but not limited to, by the first resistor R1, the second resistor R2, and the first capacitor C1. In other words, the integral unit 34 may be also implemented by an integral circuit composed of an operational amplifier (OPA) or other circuit components and ICs.

Figure 4:
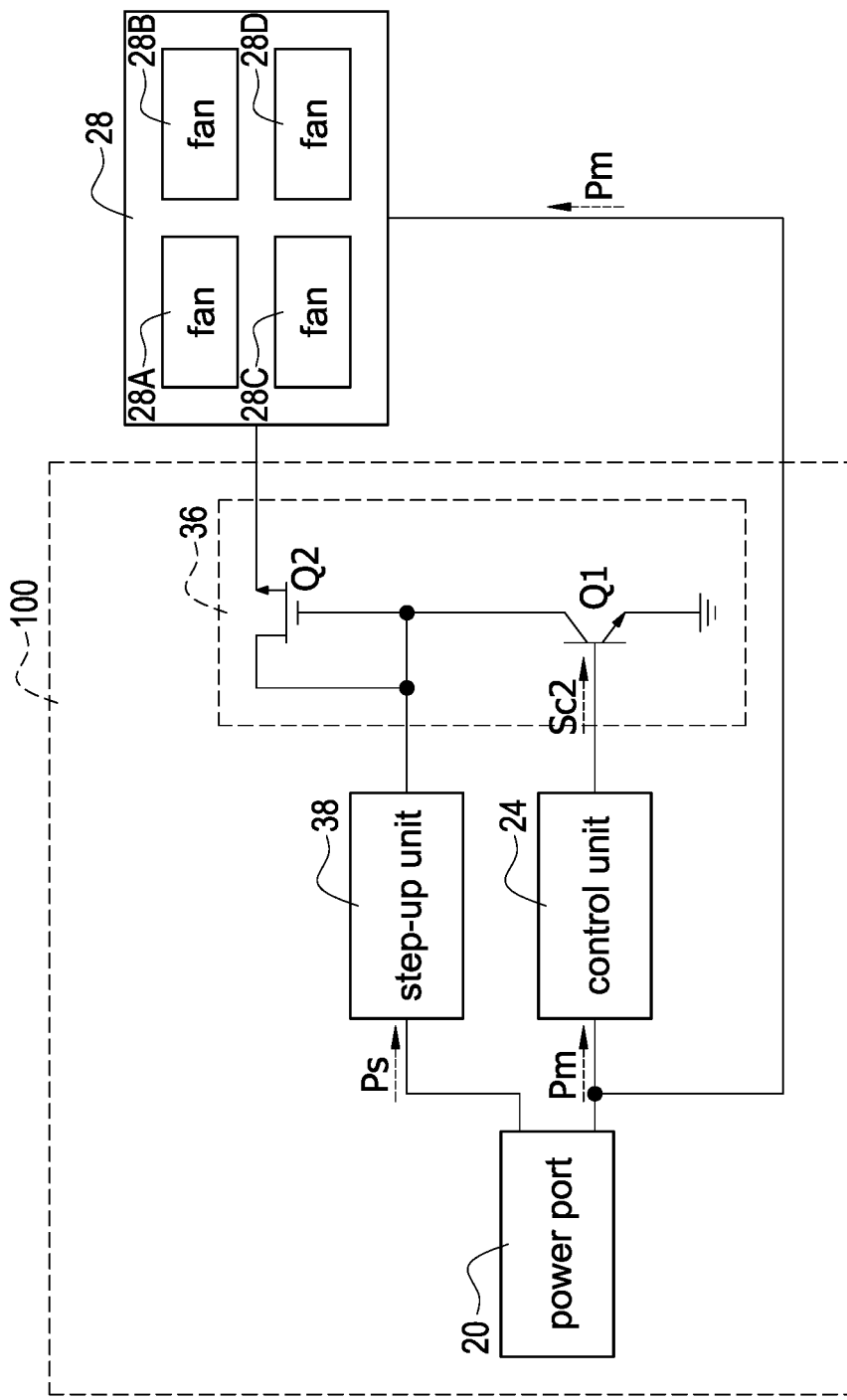
FIG. 4 shows a circuit diagram of a delay unit and a step-up unit of the fan control apparatus according to the present invention.

Refer to FIG. 4, which shows a circuit diagram of a delay unit and a step-up unit of the fan control apparatus according to the present invention. With reference also to FIG. 1. The fan control apparatus 100 further includes a delay unit 36. The delay unit 36 is connected between the power port 20, the control unit 24, and the fans 28A-28D, and the delay unit 36 receives the auxiliary power source Ps through the power port 20. When the control unit 24 detects that the main power source Pm supplied to the fans 28A-28D is disconnected, the control unit 24 outputs the second control signal Sc2 to the delay unit 36 to make the auxiliary power source Ps supply to the fans 28A-28D through the delay unit 36. Accordingly, the fans 28A-28D still rotate within a short period of time and then stop so that the heat generated from the processor 220 can be dissipated by the fans 28A-28D when the processor 220 is operated from the middle-load condition to the light-load condition. More specifically, the fan control apparatus 100 provides a delay time T existing between the main power source Pm that is disconnected and the fans 28A-28D that stop rotating. In other words, the control unit 24 stops outputting the second control signal Sc2 to the delay unit 36 to control the fans 28A-28D to stop rotating after the control unit 24 detects that the main power source Pm is disconnected and the delay time T is elapsed. In this embodiment, the delay time T is, for example but not limited to, 45 seconds, which can be adjusted according to the cooling requirement.

Refer to FIG. 4 again and with reference also to FIG. 1. The delay unit 36 includes a first switch Q1 and a second switch Q2. A control end of the first switch Q1 is connected to the control unit 24, an output end of the first switch Q1 is grounded, and an input end of the first switch Q1 is connected to an input end and a control end of the second switch Q2 and the power port 20. An output end of the second switch Q2 is connected to the fans 28A-28D. When the control unit 24 outputs the second control signal Sc2 to the delay unit 36, the first switch Q1 is turned on and then the control end of the second switch Q2 is grounded and the second switch Q2 is turned on. When the second switch Q2 is turned on, the auxiliary power source Ps is outputted to the fans 28A-28D through the second switch Q2. When the main power source Pm is disconnected, the fan control apparatus 300 controls the auxiliary power source Ps to supply the fans 28A-28D to make the fans 28A-28D still rotate within a short period of time and then stop. When the second control signal Sc2 is not outputted from the control unit 24 to the delay unit 36, the first switch Q1 is turned off and the second switch Q2 is also turned off. For example, the fans 28A-28D are supplied by the main power source Pm or the fans 28A-28D still rotates within a short period of time after the main power source Pm is connected. When the second switch Q2 is turned off, the auxiliary power source Ps is not outputted to the fans 28A-28D through the second switch Q2. In this embodiment, the delay unit 36 can be implemented, but not limited to, by the first switch Q1 and the second switch Q2. In other words, the delay unit 36 may be also implemented by other circuits having turned on/off functions.

Refer to FIG. 4 again and with reference also to FIG. 1. The fan control apparatus 100 further includes a step-up unit 38, and the step-up unit 38 is connected between the power port 20 and the delay unit 36. Since types and specifications of the fans 28A-28D are various, some fans would not be driven once a voltage value of the auxiliary power source Ps is insufficient, for example the voltage value is 5 volts. Therefore, the step-up unit 38 is provided between the power port 20 and the delay unit 36 to step the auxiliary power source Ps up, for example the voltage is step up to 8 volts so that most of the fans 28A-28D can be successfully driven. In this embodiment, the step-up unit 38 can be implemented by circuits or other proper forms having the step-up function.

Figure 5:
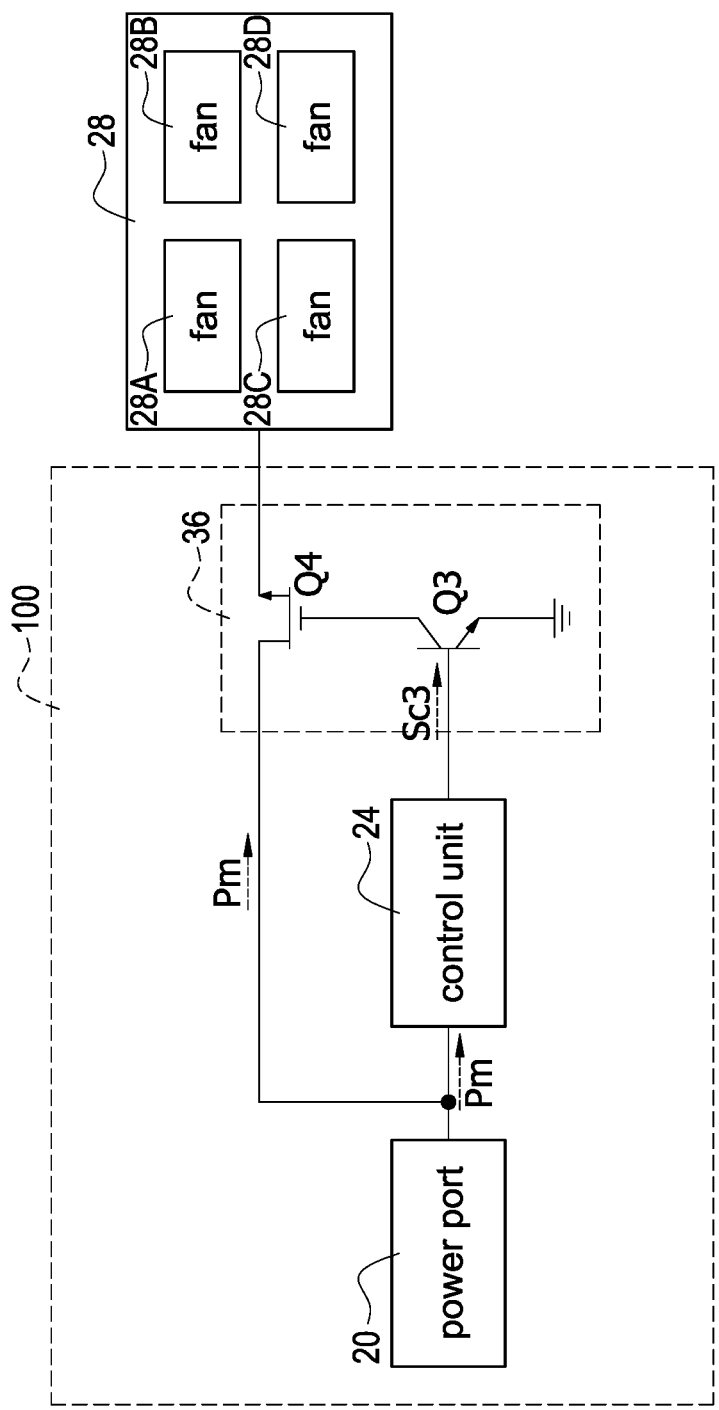
FIG. 5 shows a circuit diagram of a protection unit of the fan control apparatus according to the present invention.

Refer to FIG. 5, which shows a circuit diagram of a protection unit of the fan control apparatus according to the present invention. With reference to FIG. 1 again. The fan control apparatus 100 further includes a protection unit 40. The protection unit 40 is connected between the power port 20, the control unit 24, and the fans 28A-28D, and the protection unit 40 receives the main power source Pm through the power port 20. When the control unit 24 detects that the main power source Pm is abnormal or faulty, the control unit 24 does not output a third control signal Sc3 to the protection unit 40 so as to disconnect the power port 20 and the fans 28A-28D. In particular, the protection unit 40 includes a third switch Q3 and a fourth switch Q4. A control end of the third switch Q3 is connected to the control unit 24, an output end of the third switch Q3 is grounded, and an input end of the third switch Q3 is connected to an input end and a control end of the fourth switch Q4 and the power port 20. An output end of the fourth switch Q4 is connected to the fans 28A-28D. When the control unit 24 detects that the main power source Pm is normal, the control unit 24 outputs the third control signal Sc3 to turn on the third switch Q3 and then the control end of the fourth switch Q4 is grounded and the fourth switch Q4 is turned on. When the fourth switch Q4 is turned on, the main power source Pm is outputted to the fans 28A-28D through the fourth switch Q4. When the control unit 24 detects that the main power source Pm is abnormal or faulty, the control unit 24 does not output the third control signal Sc3 so that the third switch Q3 and the fourth switch Q4 are turned off. When the fourth switch Q4 is turned off, the main power source Pm is not outputted to the fans 28A-28D through the fourth switch Q4. In this embodiment, the protection unit 40 is used to disconnect the main power source Pm and the fans 28A-28D once the control unit 24 detects that the main power source Pm is abnormal or faulty. Therefore, the protection unit 40 can be implemented, but not limited to, by the third switch Q3 and the fourth switch Q4. In other words, the protection unit 40 may be also implemented by other circuits having turned on/off functions.

Figure 6:
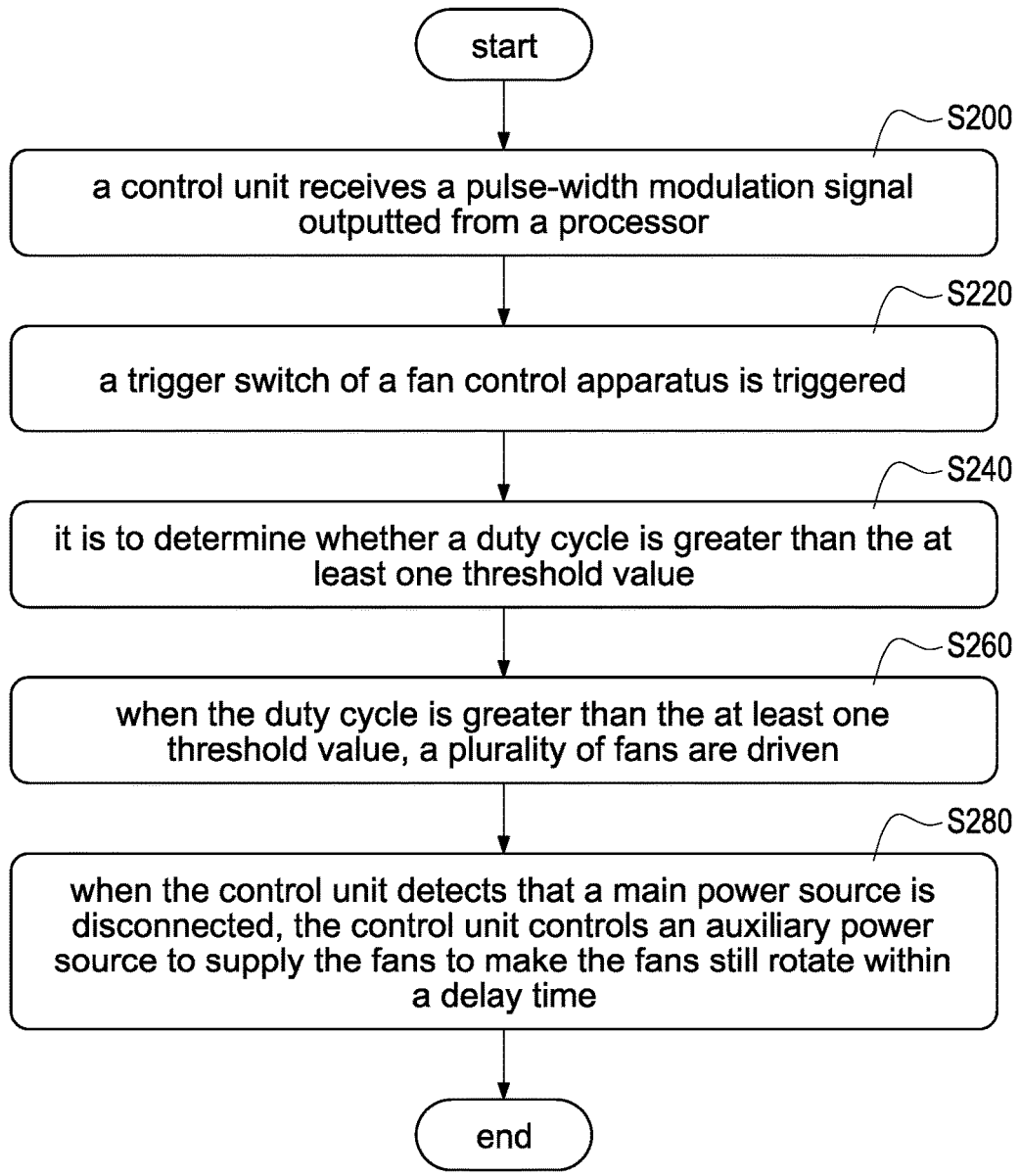
FIG. 6 shows a flowchart of a method of operating a fan control apparatus according to the present invention.

Refer to FIG. 6, which shows a flowchart of a method of operating a fan control apparatus according to the present invention. With reference to FIG. 1-FIG. 4 again. The fan control apparatus 100 is connected between a processor 220 mounted on a main board 200 and a plurality of fans 28A-28D. The method includes steps as follows. First, A control unit 24 receives a pulse-width modulation signal PWM outputted from the processor 220 (S200). When the control unit 24 receives the pulse-width modulation signal PWM outputted from the processor 220, the control unit 24 calculates a duty cycle D of the pulse-width modulation signal PWM. Afterward, a trigger switch 30 of the fan control apparatus 100 is triggered (S220). When a user triggers the trigger switch 30, the fan control apparatus 100 determines at least one threshold value Vt1-Vtn in the control unit 24 according to the number of triggering of the trigger switch 30. Afterward, it is to determine whether the duty cycle D is greater than the at least one threshold value (S240). The fan control apparatus 100 determines whether the duty cycle D of the pulse-width modulation signal PWM is greater than the at least one threshold value Vt1-Vtn in the control unit 24 to decide which fans 28A-28D should be driven. Afterward, when the duty cycle D of the pulse-width modulation signal PWM is greater than the at least one threshold value Vt1-Vtn, the fans 28A-28D are driven (S260). The fan control apparatus 100 outputs a first control signal Sc1 to a drive unit 26 according to the duty cycle D of the pulse-width modulation signal PWM. The drive unit 26 outputs a drive signal Sd to the fans 28A-28D to drive the fans 28A-28D to rotate. If the number of the at least one threshold value Vt1-Vtn is one and the threshold value Vt is varied according to the number of triggering of the trigger switch 30, the control unit 24 controls all fans 28A-28D to rotate when the control unit 24 detects that the duty cycle D of the pulse-width modulation signal PWM is greater than the threshold value Vt. If the number of the at least one threshold value Vt1-Vtn is plural and the threshold values Vt1-Vtn are adjusted or the number of the threshold values Vt1-Vtn is increased according to the number of triggering of the trigger switch 30, the control unit 24 gradually increases the number of the fans 28A-28D which rotate when the duty cycle D of the pulse-width modulation signal PWM is gradually increased than one of the at least one threshold values Vt1-Vtn.

Finally, when the control unit 24 detects that the main power source Pm is disconnected, the control unit 24 controls the auxiliary power source Ps to supply the fans 28A-28D to make the fans 28A-28D still rotate within a delay time T (S280). When the control unit 24 detects that the main power source Pm is disconnected, the control unit 24 outputs a second control signal Sc2 to a delay unit 36, and the auxiliary power source Ps is supplied to the fans 28A-28D through the delay unit 36 so that the fans 28A-28D can still rotate within a short period of time and then stop. In particular, the main structure of the fan control apparatus 100 shown in FIG. 1 can be appropriate applied to embodiments of FIG. 2A-FIG. 2D and FIG. 3-FIG. 5 so as to flexibly control the fans 28A-28D to rotate.

In conclusion, the embodiments of the present invention have the following advantages:

1. It is to reduce noises produced from the fans since the fan control apparatus controls the fans to stop rotating when the duty cycle of the pulse-width modulation signal.

2. It is to reduce power consumption originated from the fans since the fan control apparatus uses a single threshold value or a plurality of threshold values to flexibly control these fans.

3. The heat generated from the processor can be dissipated by the fans 28A-28D since the fans still rotate within a short period of time after the main power source is disconnected.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A fan control apparatus comprising:
   a power port configured to receive a main power source and an auxiliary power source;
   a control unit connected between the power port and a processor mounted on a main board;
   a drive unit connected to the control unit; and
   a trigger switch connected to the control unit;
   wherein the control unit is configured to receive a pulse-width modulation signal with a duty cycle outputted from the processor, and the control unit is configured to determine whether the duty cycle is greater than at least one threshold value set by the control unit, wherein the duty cycle is varied according to a number of triggering of the trigger switch; when the duty cycle is greater than the at least one threshold value, the control unit is configured to control a plurality of fans through the drive unit.

2. The fan control apparatus in claim 1, wherein the control unit is configured to set a plurality of threshold values, and the fan control apparatus is configured to adjust the threshold values or increase the number of the threshold values according to the number of triggering of the trigger switch; when the duty cycle is gradually increased to greater than at least one of the threshold values, the control unit is configured to output a first control signal to the drive unit and the increased number of fans are driven by the drive unit.

3. The fan control apparatus in claim 2, further comprising:
an integral unit connected between the processor and the control unit;
wherein the integral unit is configured to integrate the pulse-width modulation signal into a voltage signal, and the control unit is configured to determine whether a duty cycle corresponding to the voltage signal is greater than the threshold value according to the number of triggering of the trigger switch so as to decide which fans should be driven.

4. The fan control apparatus in claim 2, further comprising:
a display unit assembly configured to display the number of triggering of the trigger switch.

5. The fan control apparatus in claim 3, wherein the integral unit comprises:
a first resistor connected to the processor;
a second resistor connected between the first resistor and the control unit; and
a first capacitor connected between the first resistor, the second resistor, and a ground point;
wherein when the integral unit is configured to receive the pulse-width modulation signal, and the pulse-width modulation signal is provided to charge the first capacitor so that the voltage signal is formed across the first capacitor.

6. The fan control apparatus in claim 1, further comprising:
a delay unit connected to the power port, the control unit, and the fans;
wherein when the control unit is configured to detect that the main power source supplied to the fans through the power port is disconnected, the control unit is configured to output a second control signal to the delay unit so that the auxiliary power source is supplied to the fans through the delay unit to make the fans still rotate, and then the control unit is configured to stop outputting the second control signal to the delay unit to make the fans stop rotating after a delay time.

7. The fan control apparatus in claim 6, further comprising:
a step-up unit connected between the power port and the delay unit, and the step-up unit configured to step the auxiliary power source up.

8. The fan control apparatus in claim 7, wherein the delay unit comprises:
a first switch connected between the control unit and the ground point; and
a second switch connected between the first switch, the power port, and the fans;
wherein when the control unit is configured to output the second control signal to the delay unit, the first switch is turned on and a control end of the second switch is grounded and the second switch is turned on so that the auxiliary power source is supplied to the fans.

9. The fan control apparatus in claim 1, wherein when the duty cycle is greater than at least one threshold value, the control unit is configured to control the fans to gradually increase speed of the fans according to the gradually increased duty cycle.

10. A method of operating a fan control apparatus connected between a processor mounted on a main board and a plurality of fans, the method comprising steps of:
(a) receiving a pulse-width modulation signal outputted from the processor by the fan control apparatus;
(b) triggering a trigger switch of the fan control apparatus;
(c) setting at least one threshold value and determining whether the duty cycle of the pulse-width modulation signal is greater than the at least one threshold value, wherein the at least one threshold value is varied according to a number of triggering of the trigger switch; and
(d) driving the fans to rotate when the duty cycle is greater than that at least one threshold value.

11. The method of operating the fan control apparatus in claim 10, wherein the step (d) further comprises a step of:
(d1) setting a plurality of threshold values and adjusting the threshold values or increasing the number of the threshold values according to the number of triggering of the trigger switch by the fan control apparatus, and increasing the number of the fans driven when the duty cycle is gradually increased to greater than at least one of the threshold values.

12. The method of operating the fan control apparatus in claim 11, further comprising a step of:
(e) supplying an auxiliary power source to the fans by the fan control apparatus to make the fans still rotate when a main power source supplied to the fans is disconnected, and then disconnecting the auxiliary power source to make the fans stop rotating after a delay time.

* * * * *